H. W. PAULUS.
PROCESS OF MANUFACTURING HYDROCHLORIC ACID AND CARBON MONOXIDE.
APPLICATION FILED JULY 19, 1920.
1,420,209.
Patented June 20, 1922.
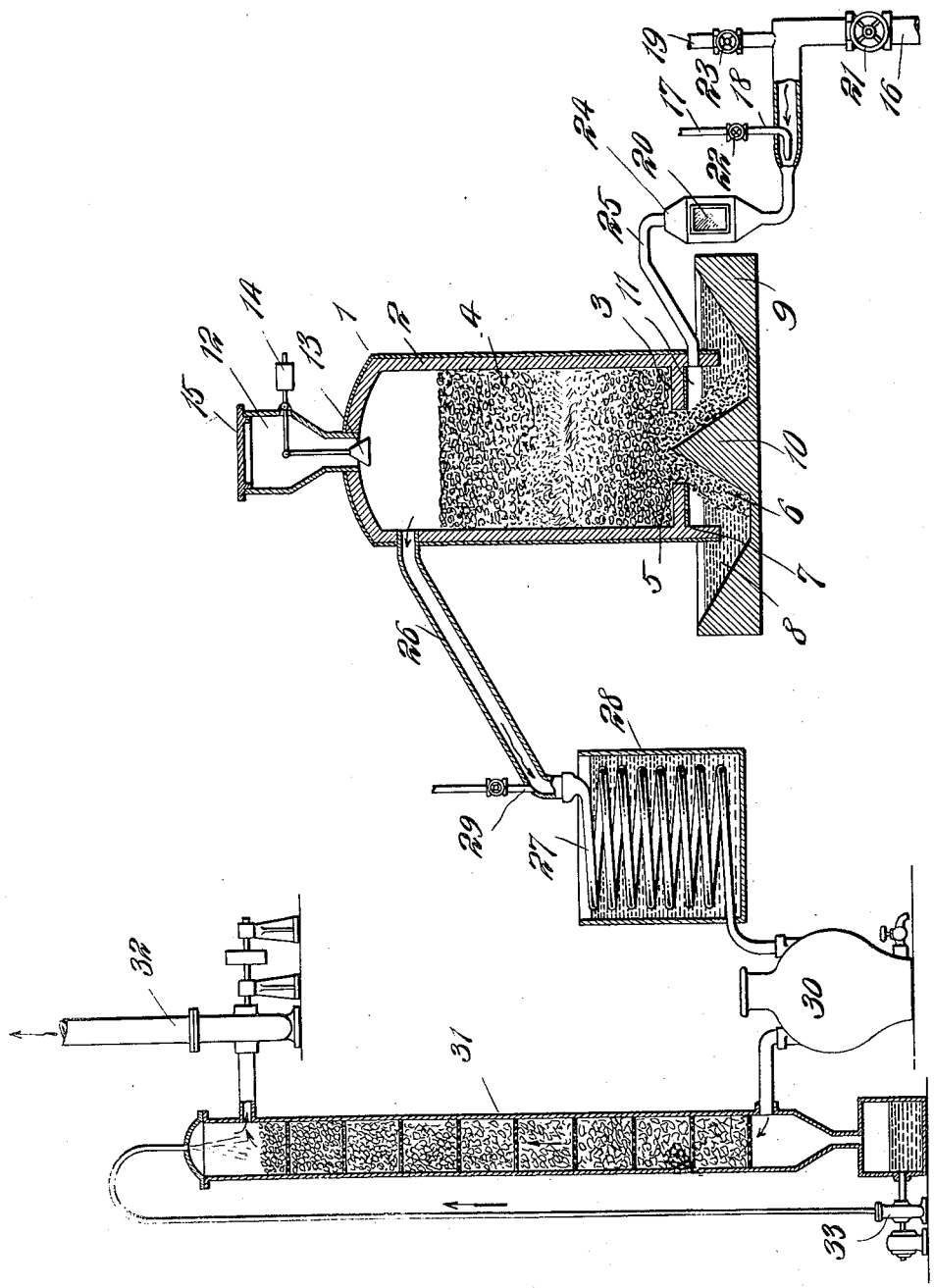

UNITED STATES PATENT OFFICE.

HERMAN W. PAULUS, OF RICHMOND HILL, NEW YORK, ASSIGNOR TO ROYAL BAKING POWDER COMPANY, A CORPORATION OF NEW JERSEY.

PROCESS OF MANUFACTURING HYDROCHLORIC ACID AND CARBON MONOXIDE.

1,420,209.  Specification of Letters Patent.  Patented June 20, 1922.

Application filed July 19, 1920. Serial No. 397,426.

*To all whom it may concern:*

Be it known that I, HERMAN W. PAULUS, a citizen of the United States, and a resident of Richmond Hill, Long Island, in the county of Queens and State of New York, have invented certain new and useful Improvements in Processes of Manufacturing Hydrochloric Acid and Carbon Monoxide, of which the following is a specification.

The present invention relates to a process of manufacturing hydrochloric acid and carbon monoxide.

It is common practice in the manufacture of hydrochloric acid to pass a mixture of chlorine and water vapor through an externally heated retort containing carbonaceous material, such as coke. Considerable difficulty has heretofore been experienced in providing satisfactory retorts. An externally heated retort of refractory material has proven unsatisfactory for many reasons. A more efficient retort has been an electrically heated one, but this is prohibitively expensive to maintain and the heat distribution is not entirely uniform, the heat being always greatest near the electrodes.

The average percentage of the constituents of ordinary producer gas is approximately 60% nitrogen, 22% carbon monoxide, 15% hydrogen and some carbon dioxide, oxygen and illuminants. For some purposes, as for example in the manufacture of formates, it is desirable to have a higher percentage of carbon monoxide. Moreover, the presence of a large amount of hydrogen, although it does not interfere with the chemical reaction, renders the process that much more hazardous.

One object of the present invention is to produce a process of manufacturing hydrochloric acid by which a more efficient and a more economical retort may be employed for practising the process. Another object of the invention is to produce a carbon monoxide containing gas by a process whereby the percentage of carbon monoxide will be relatively larger and the percentage of hydrogen, carbon dioxide and other gases relatively smaller than in producer gases and other gases containing CO. With these objects in view the invention consists in passing the mixture of chlorine and water vapor from which the hydrochloric acid and carbon monoxide are produced through an incandescent mass of carbonaceous material contained in a closed retort. Just enough air to maintain the carbonaceous material at the proper temperature for effecting the desired chemical reaction is admitted with the mixture of chlorine and water vapor. It will be recognized that although the chemical reaction between the chlorine and the hydrogen of the water vapor is exothermic, nevertheless additional heat must be furnished because the admission of the water vapor such as steam tends constantly to lower the temperature below a point at which the reaction takes place. The improved process constituting the subject-matter of the invention is more fully described in the following specification and particularly pointed out in the appended claims.

In the accompanying drawing is illustrated diagrammatically an apparatus in which the improved process of manufacturing hydrochloric acid and carbon monoxide may be practised.

The retort through which the chlorine and water vapor are passed for the purpose of converting them into hydrochloric acid and carbon monoxide may in its general features of construction be of any usual or preferred form. The retort shown in the drawing consists of an upright receptacle 1 lined with acid-proof refractory material 2. The bottom 3 of the retort for supporting the carbonaceous material 4, such as coke, is provided with a central opening 5 through which pass the ashes 6 resulting from the destruction of the coke. The bottom end of the retort is provided with a downwardly extending flange 7 and this flange is set in a liquid seal 8, which is preferably a sodium chloride seal contained in a dish-like receptacle 9, having a conical or pyramidal section 10 projecting upwardly into the central opening 5 of the retort so as to properly deflect the ashes. A space 11 exists between the top of the liquid seal and the bottom of the retort so as to permit the mixture of chlorine and water vapor to pass up into the retort. The coke is supplied to the retort from time to time through a magazine 12, the lower opening of which is adapted to be closed by a valve 13 controlled by a weight 14. The upper opening of the magazine is sealed by a cover 15.

The chlorine is supplied through a pipe 16, and the water vapor in steam form is supplied through a pipe 17, the lower end 18 of which enters the pipe 16 and constitutes an injector nozzle. The air necessary to maintain the carbonaceous material at the proper temperature is admitted through the pipe 19. The injector nozzle serves to intimately mix the chlorine and water vapor and the mixture may be observed through a lantern or window 20. The pipes 16, 17 and 19 are provided with valves 21, 22 and 23, respectively, so as to secure the proper proportion of chlorine, water vapor and air. From the mixing chamber 24 containing the lantern 20, the mixture passes through a pipe 25 into the space 11 and thence through the opening 5 up through the incandescent mass of carbonaceous material.

In passing through the incandescent mass of carbonaceous material the water mass is split into its constituent parts and the hydrogen thereof combines with the chlorine to form hydrochloric acid gas, and the oxygen combines with the carbon to form a mixture of carbon monoxide and carbon dioxide. From the retort the gases pass through a cooling pipe 26 into a stoneware condensing coil 27, set in a water tank 28. The hydrochloric acid gas is partially condensed in passing through the cooling pipe and as it enters the condensing coil 27 it is mixed with steam from a pipe 29. The hydrochloric acid resulting from the condensation is received in a vessel or tank 30. The greater portion of the acid condenses in the coil 27 and runs into the receptacle 30. Such part of the hydrochloric acid gas as remains mixed with the carbon monoxide and carbon dioxide is eliminated therefrom by passing the gases through a scrubber or absorption tower 31 with which is connected an exhauster pump 32 and a circulating water pump 33.

By admitting just sufficient air to support combustion the proportion of carbon dioxide evolved is kept relatively low and conversely a large proportion of carbon monoxide is evolved. The splitting up of the water vapor into its constituent parts eliminates substantially the whole of the hydrogen because this element combines with the chlorine. There is left therefore only the nitrogen of the air, the relatively large amount of carbon monoxide and the relatively small amount of carbon dioxide, hydrogen and such hydrochloric acid gas as does not condense in passing through the condensing coils, and possibly a trace of oxygen. It may be convenient to point out that it is believed that the oxygen combines with the carbon in the lower part of the retort to form carbon dioxide and then as this gas passes up through the zone of greatest temperature it is converted into carbon monoxide.

In practising the process of the present invention, the retort is filled with coke and a fire is started and blown up with air alone. As soon as the lower layers of the coke reach the point of incandescence the proper proportions of chlorine gas and steam are admitted with just sufficient air to maintain the temperature necessary for the desired chemical reaction. As the coke wastes away, the ashes are removed from the receptacle 9 without interfering with the practise of the process and also the coke is replenished from time to time through the magazine 12.

It will be recognized that by means of the present invention the heating of the retort is simplified and rendered more economical. This is because the materials of which the hydrochloric acid gas and carbon monoxide are formed are passed through and mingle with the combustion gases. Thus it is obvious by practising the process in an internally heated retort a considerable amount of fuel is saved, and the heat more evenly distributed. It will also be recognized that the gases removed from the scrubber or absorption tower 31 by the exhaust fan 32 are peculiarly adapted for any purpose for which a relatively pure carbon monoxide gas is used because of the fact that this gas contains 99% of nitrogen and carbon monoxide, with only a trace of other gases.

Having thus described the invention, what I claim as new is:

1. The process of making hydrochloric acid and carbon monoxide which comprises mixing chlorine and water vapor in proper proportions, passing the mixture through an incandescent mass of carbon contained in a vessel sealed from the atmosphere and introducing with the water vapor and chlorine sufficient air to maintain the carbon at the necessary temperature for the desired chemical reactions.

2. The process of making hydrochloric acid and carbon monoxide, which comprises passing a mixture of chlorine, water vapor and air through a mass of incandescent carbon contained in a vessel sealed from the atmosphere.

3. The process of making hydrochloric acid which comprises maintaining a mass of carbon in a closed vessel at a temperature sufficient to cause water vapor to divide into its constituent parts, and passing a mixture of chlorine, water vapor and air through the mass of carbon.

4. The process of making hydrochloric acid which comprises enclosing a mass of carbon in a closed vessel having an inlet and an outlet, heating a portion of the carbon to a point of incandescence, passing a mixture of chlorine and water vapor through the incandescent carbon and introducing with the mixture of chlorine and water vapor sufficient air to maintain the carbon at a temperature necessary to produce the desired chemical reactions.

5. The process of making hydrochloric acid which comprises mixing chlorine and water vapor in proper proportions, introducing into the mixture an amount of air just sufficient to support combustion and passing the mixture through a mass of incandescent carbon contained in a closed vessel having an inlet and an outlet.

6. The process of producing carbon monoxide which comprises passing a mixture of chlorine, water vapor and air through an incandescent mass of carbon, condensing the hydrochloric acid thus formed and passing the remaining gases through an absorption tower.

7. The process of producing carbon monoxide which comprises passing a mixture of chlorine, water vapor and air through a mass of incandescent carbon contained in a vessel sealed from the atmosphere, condensing out the hydrochloric acid and removing the foreign gases from the nitrogen and carbon monoxide.

8. The process of producing carbon monoxide which comprises passing a mixture of chlorine and water vapor with just sufficient air to support combustion through an incandescent zone of carbon sealed from the atmosphere, condensing the hydrochloric acid gas and scrubbing the nitrogen and carbon monoxide to remove the foreign gases therefrom.

HERMAN W. PAULUS.